US008336183B2

(12) United States Patent  (10) Patent No.: US 8,336,183 B2
Martin  (45) Date of Patent: Dec. 25, 2012

(54) METHOD TO PROTECT TIRE ELECTRONICS

(75) Inventor: Terry J Martin, Duncan, SC (US)

(73) Assignee: Michelin Recherche et Technique S.A. (CH)

( * ) Notice: Subject to any disclaimer, the term of this patent is extended or adjusted under 35 U.S.C. 154(b) by 304 days.

(21) Appl. No.: 12/602,080

(22) PCT Filed: May 25, 2007

(86) PCT No.: PCT/US2007/069748
§ 371 (c)(1),
(2), (4) Date: Jun. 25, 2010

(87) PCT Pub. No.: WO2008/147409
PCT Pub. Date: Dec. 4, 2008

(65) Prior Publication Data
US 2010/0265689 A1 Oct. 21, 2010

(51) Int. Cl.
B23P 11/00 (2006.01)
G01M 17/02 (2006.01)
(52) U.S. Cl. ............................................ 29/428; 73/146
(58) Field of Classification Search ................ 152/152.1; 73/146; 361/111; 29/428
See application file for complete search history.

(56) References Cited

U.S. PATENT DOCUMENTS

| 4,498,697 | A | * | 2/1985 | McGlone et al. ............. 293/128 |
| 5,181,975 | A | * | 1/1993 | Pollack et al. ............. 152/152.1 |
| 5,218,861 | A | * | 6/1993 | Brown et al. ................ 73/146.5 |
| 5,562,787 | A | * | 10/1996 | Koch et al. ....................... 156/64 |
| 5,573,610 | A | * | 11/1996 | Koch et al. ................. 152/152.1 |
| 5,573,611 | A | * | 11/1996 | Koch et al. ................. 152/152.1 |
| 5,992,807 | A | * | 11/1999 | Tarulli ......................... 248/206.5 |
| 6,255,940 | B1 | * | 7/2001 | Phelan et al. ................. 340/447 |
| 6,444,069 | B1 | * | 9/2002 | Koch et al. ..................... 156/123 |
| 6,462,650 | B1 | * | 10/2002 | Balzer et al. .................. 340/442 |
| 6,860,303 | B2 | * | 3/2005 | Rensel et al. ................ 152/152.1 |
| 6,868,878 | B2 | * | 3/2005 | Janajreh et al. ............. 152/152.1 |
| 6,966,219 | B2 | * | 11/2005 | Starinshak ....................... 73/146 |
| 7,009,506 | B2 | * | 3/2006 | Wilson et al. ................. 340/445 |
| 7,429,801 | B2 | * | 9/2008 | Adamson et al. ............. 290/1 R |
| 7,770,444 | B2 | * | 8/2010 | Bertrand ....................... 73/146.5 |
| 7,826,192 | B2 | * | 11/2010 | Sinnett et al. .................. 361/111 |
| 2004/0164558 | A1 | | 8/2004 | Adamson et al. |
| 2005/0076982 | A1 | * | 4/2005 | Metcalf et al. ............. 152/152.1 |
| 2005/0076992 | A1 | * | 4/2005 | Metcalf et al. ............. 156/110.1 |
| 2005/0126668 | A1 | * | 6/2005 | Fornerod et al. ........... 152/152.1 |

(Continued)

FOREIGN PATENT DOCUMENTS
WO  WO 2008147409 A1 * 12/2008

OTHER PUBLICATIONS

International Search Report with Written Opinion, mailed Jun. 4, 2008 for PCT/US07/69748 filed May 25, 2007.

Primary Examiner — Essama Omgba
(74) Attorney, Agent, or Firm — Frank J. Campigotto

(57) ABSTRACT

A method is provided for protecting an electronics device, attached to a tire, during tire inspection, comprising placing a barrier in proximity to the electronics device wherein the barrier surrounds the electronics device, and removedly affixing the barrier to the tire with magnets.

10 Claims, 2 Drawing Sheets

U.S. PATENT DOCUMENTS

| | | | |
|---|---|---|---|
| 2005/0217774 A1* | 10/2005 | Borot | 152/152.1 |
| 2006/0006728 A1* | 1/2006 | Sinnett | 301/5.1 |
| 2006/0158340 A1* | 7/2006 | Wilson et al. | 340/693.12 |
| 2006/0237109 A1* | 10/2006 | Mangold et al. | 152/152.1 |
| 2007/0175554 A1* | 8/2007 | Bertrand | 152/152.1 |
| 2007/0279827 A1* | 12/2007 | Sinnett et al. | 361/131 |
| 2010/0007477 A1* | 1/2010 | Wilson et al. | 340/426.33 |

* cited by examiner

US 8,336,183 B2

METHOD TO PROTECT TIRE ELECTRONICS

BACKGROUND OF THE INVENTION

1. Field of the Invention

The present invention relates generally to a protective device, and more specifically for a method and device for providing protection to tire electronics during inspection.

2. Background

The incorporation of electronic devices with pneumatic tire and wheel structures provides many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feedback systems to regulate proper tire and/or vehicle parameters.

While the use of tire electronics has many practical advantages, the presence of such tire electronics may create difficulties during periods of a tire's useful life. One particular period occurs when a tire equipped with such tire electronics is brought to a facility for recapping.

One commonly used method for inspecting a tire for anomalies prior to recapping such tire involves the use of a high voltage probe in the form of a wire. During tire inspection, high voltage energized wire loops are brushed against the interior of the tire causing sparks to jump from the wire to the site of any anomalies. Such high voltage discharges may damage the tire electronics, and moreover, the wire itself may snag the electronics package causing mechanical damage to the tire electronics package.

SUMMARY OF THE INVENTION

A method is provided for protecting an electronics device, attached to a tire, during tire inspection, comprising placing a barrier in proximity to the electronics device wherein the barrier surrounds the electronics device, and removedly affixing the barrier to the tire. Further, a method is provided for protecting an electronics device, attached to a tire, during tire inspection, comprising placing a barrier in proximity to the electronics device wherein the barrier surrounds the electronics device, and removedly affixing the barrier to the tire with rare earth magnets. A barrier is provided for protecting an electronics device during tire inspection, the electronics device attached to a tire, the barrier comprising magnets embedded in a flexible material, wherein the flexible material comprises a rubber layer no greater than 1 millimeter thick, the barrier further comprises a first set of rubber reinforcements on said barrier, and a second set of one rubber reinforcement located proximal to the center of the barrier, each of reinforcements having a thickness greater than 1 millimeter, and the magnets are embedded in the first set of rubber reinforcements.

DETAILED DESCRIPTION OF THE PREFERRED EMBODIMENTS

Advantageously, particular embodiments of the present invention provide a method that offers protection of electronic devices from damage during an inspection of a tire. Other embodiments provide a protective barrier that can be attached to the tire to protect the tire electronics. The technology has particular applicability to a tire inspection environment and the protection of associated tire electronics but is applicable to other testing environments as well.

Figure 1:
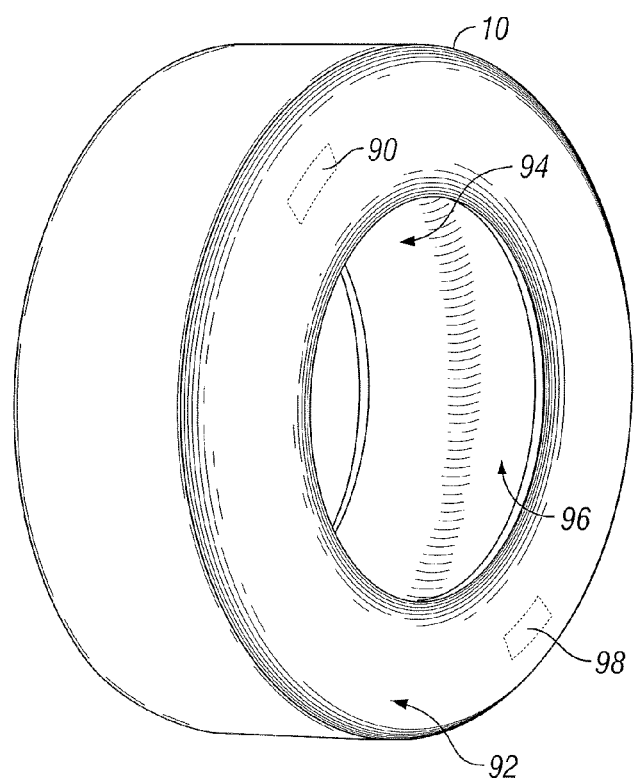
FIG. 1 illustrates a tire and alternative locations for tire electronic devices.

Referring now to the drawings, FIG. 1 illustrates several alternative locations where tire electronics devices may be mounted in, on or within a tire in accordance with certain embodiments of the present invention. As illustrated in FIG. 1, one or more tire electronics devices 90 may be associated with the tire 10 by mounting such devices on the outside of the tire side wall 92, on the inside of the sidewall 94, on the inner liner of the tire under the crown 96, or physically embedded within the tire structure as illustrated by the dotted line rectangle 98. Any, some, or all of these locations might be used for tire electronics device locations in any one tire. Moreover, plural tire electronics devices may be arranged such that a plurality of conditions may be detected to obtain the widest possible range of discernible data.

It should be noted that the present disclosure is not limited to the testing of tires and methodologies for the protection of electronic devices associated with such tires. In particular various protection methodologies described herein may also be applicable in other environments where different testing techniques may be applied and wherein electronic devices associated with devices or items under test in such environments undesirably may be subject to damage as a result of such testing techniques. A non-limiting examples of such testing environments may include testing associated with EMP (Electro Magnetic Pulse).

Figure 2:
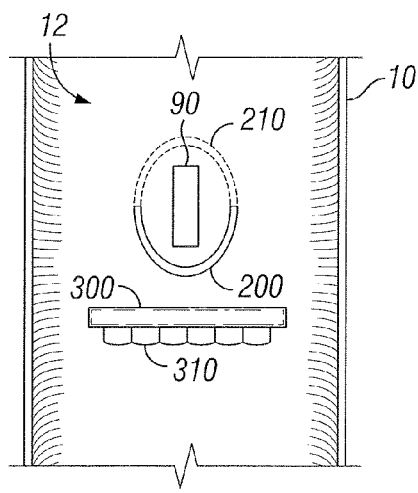
FIGS. 2 and 2a are top and side cross sectional views of a first embodiment of the present invention showing physical protection of a tire electronics device.
Figure 2A:
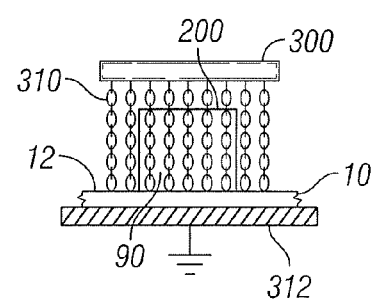

FIGS. 2 and 2a illustrate a tire testing operation, FIG. 2 showing a top view and FIG. 2a showing a side cross-sectional view. Wires 310 brush across the inside surface 12 of tire 10. In an actual test, tire 10 may be rotated while wires 310 remain stationary to produce relative motion between the tire 10 and wires 310. By virtue of being coupled by way of metal header 300 to a high-voltage power supply, brushing wires 310 across the tire surface 12 will result in a spark between one or more of wires 310 and any anomaly in the tire to a grounded conductive plate or roller 312 (not shown in FIG. 2). The provision of the protective barrier 200 and its optional extension 210 prevents wires 310 from coming into contact with tire electronics device 90 thereby protecting the device from damaging electrical discharge. As a non-limiting example, the high voltage supply coupled via metal header 300 to wires 310 may correspond to a supply having a peak output of about 80 kV DC.

As illustrated in FIGS. 2 and 2a, a portion of a tire 10 shows a tire electronics device 90 secured to an inside surface 12 of tire 10. In this embodiment, a protective barrier 200 is placed on the inside tire surface 12 to provide physical protection for tire electronics device 90 from contact by wires 310. Wires 310 may take the form of conductive key chains. As shown, the protective barrier 200 is placed so that the barrier at least partially surrounds tire electronics device 90 and may, by way of an optional portion 210 completely surround the tire electronics device 90. In a preferred embodiment, the protective barrier 200 may be removed and reattached, for example, by magnets which are attracted to metal within the tire. The electronics device 90 will typically consist of an tag (such as an RFID tag) and an attached antenna.

Figure 3:
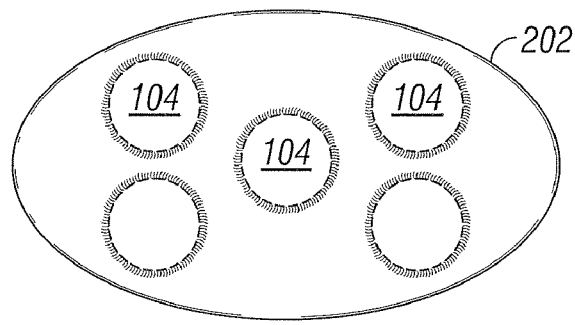
FIG. 3 is a top view of a tire protection patch.

The protective barrier 200 may take the form of a patch 202, as shown in FIG. 3. The patch 202 may be formed of rubber or it may be formed of another flexible material, such as a polymer. Suitable rubber may include diene rubber known to one of ordinary skill in the art to be rubber resulting at least in part, i.e., a homopolymer or a copolymer, from diene monomers, i.e., monomers having two double carbon-carbon bonds, whether conjugated or not.

The patch 202 itself is thin enough so that it shapes itself to the contours of the tire. Particular embodiments provide a patch 202 having a thickness between 0.8 and 2 millimeters. On the patch 202 there may be a plurality of reinforced areas of increased thickness 104, and the reinforced areas 104 may be made of the same material as the patch 202. For example, in the center of the patch 202 there may be a reinforced area 104 which will serve to provide extra protection to the electronics device underneath. As a non-limiting example, the reinforcements may be in the shape of a spherical dome. As discussed above, the protective patch 202 should surround the electronics device 90 either partially or completely, but it also should not be so large as to interfere with the operation of the testing device.

Figure 4:
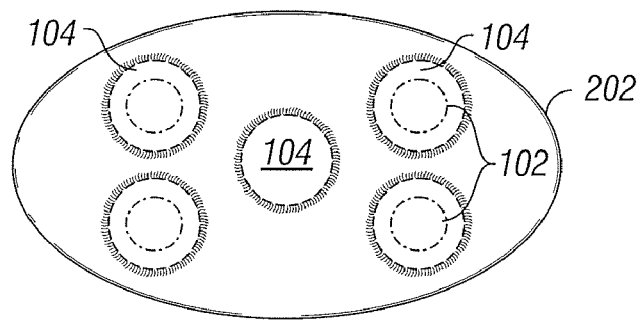
FIG. 4 is a bottom view of a tire protection patch.

The magnets 102 may be embedded in the reinforced areas 104 on the patch 202, or directly on the patch 202. In a particular embodiment, the magnets 102 do not protrude past the surface of the patch 202 to prevent a space from opening between the surface of the patch 202 and the surface of the tire 10 to which it is attached. FIG. 4 is an exemplary embodiment illustrating where the magnets 102 are embedded in the reinforced areas 104 on the protective patch 202. Some conventional radial tires use multiple belt plies with steel reinforcing materials. Furthermore, some tires utilize a metallic carcass. In an embodiment where the barrier is attached to the crown 96, the magnets 102 are attracted to the steel plies within the tire 10. In an embodiment where the barrier is attached to a side wall, the magnets 102 are attracted to the metal in the carcass. As pointed out above, the patch 202 may be removed and reattached as necessary. In an alternative to embedding the magnets 102 within the patch 202, the patch 202 may also be placed between the magnets 102 and the tire ply.

In particular embodiments, the magnets 102 used for attaching the patch 202 to the tire 10 are rare-earth magnets. Rare-earth magnets are strong, permanent magnets made from alloys of rare earth elements. Rare-earth magnets are substantially stronger than iron or alnico magnets. Magnetic fields produced by rare-earth magnets can be in excess of 1.2 teslas. Iron or ceramic magnets typically exhibit 50 to 100 milliteslas. Neodymium magnets are a common, powerful and affordable type of rare-earth magnet. Neodymium magnets are made of neodymium, iron and boron. The formula for Neodymium magnets is $Nd_2Fe_{14}B$. Samarium-cobalt magnets, having the formula $SmCo_5$, are another common type of rare-earth magnets that may be used. It is to be understood, however, that the invention is not limited to rare earth magnets, and any variety of strong, permanent magnets may be used.

Particular embodiments of the present invention further include a number of additional protective features employed to provide protection to the tire electronics device 90; these involve tire electronic device protection methodologies wherein a barrier of varying electrical properties is either temporarily or permanently applied over the tire electronics device.

Figure 5:
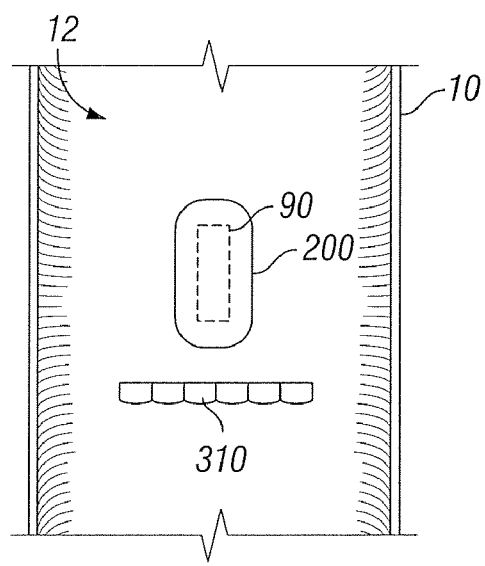
FIG. 5 illustrates further embodiments of the present technology where different materials having different electrical properties may be employed to provide protection of a tire electronics device.

FIG. 5 illustrates these embodiments. A barrier 200 of insulating material is temporarily or permanently installed over the tire electronics device 90 thereby preventing formation of electronics damaging sparks. A second embodiment provides for the temporary or permanent installation of a barrier 200 of conductive material over the tire electronics device 90. This provides a Faraday cage configuration that draws an arc from the high-voltage energized wires 310 but prevents any voltage gradients within the package forming the tire electronics device 90. The electrical charges within the enclosing conductor repel each other and will therefore reside on the outside surface of the cage Finally a third, particular configuration for the embodiments corresponds to a barrier 200 of resistive material over the tire electronics device 90. The barrier might have a surface resistivity of at least $10^{12}$ ohms/sq and a volume resistivity of at least $10^9$ ohms*cm. Such a resistive material barrier may or may not allow an arc to form but controls both the magnitude and the rate-of-rise of the current in the material to levels that are not damaging to the tire electronics device 90. As a non-limiting example of suitable resistive materials, carbon impregnated rubber may be employed with the carbon particle concentration being adjusted to achieve magnitude and rate-of-rise of current limitations as desired.

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method for protecting an electronics device, attached to a tire, during tire inspection, comprising;
   placing a barrier in proximity to the electronics device wherein the barrier completely surrounds the electronics device; and
   removably affixing the barrier to the tire with magnets, wherein the barrier is a rubber barrier no greater than 1 millimeter thick; the rubber barrier further comprising a first set of rubber reinforcements on the rubber barrier, and a second set of one rubber reinforcement located proximal to the center of the barrier, each of said reinforcements having a thickness greater than 1 millimeter with the magnets embedded in the first set of rubber reinforcements and arranged so that the magnets do not protrude past a bottom side of the barrier.

2. The method of claim 1, further comprising placing the barrier between the magnets and a tire ply.

3. The method of claim 1, wherein the barrier comprises an electrically insulating material.

4. The method of claim 1, wherein the barrier comprises an electrically conductive material.

5. The method of claim 1, wherein the barrier comprises a material with a surface resistivity of at least $10^{12}$ ohms/sq and a volume resistivity of at least $10^9$ ohms*cm.

6. The method of claim 1, wherein the magnets for affixing the barrier to the tire are iron magnets.

7. The method of claim 1, wherein the magnets for affixing the barrier to the tire are rare earth magnets.

8. The method of claim 7, wherein the rare earth magnets have a flux density of at least 0.9 teslas.

9. A barrier for protecting an electronics device during tire inspection, the electronics device attached to a tire, the barrier comprising magnets embedded in a flexible material, the flexible material comprising a rubber layer no greater than 1 millimeter thick; the barrier further comprises a first set of rubber reinforcements on the barrier, and a second set of one rubber reinforcement located proximal to the center of the barrier, each of said reinforcements having a thickness greater than 1 millimeter; and the magnets are embedded in the first set of rubber reinforcements and arranged so that the magnets do not protrude past a bottom side of the barrier.

10. The barrier of claim 9, wherein the magnets are rare earth magnets and have a flux density of at least 0.9 teslas.

\* \* \* \* \*